United States Patent
Hussain et al.

(10) Patent No.: US 10,536,332 B1
(45) Date of Patent: Jan. 14, 2020

(54) CONFIGURATION INVOCATION MANAGEMENT

(71) Applicant: Amazon Technologies, Inc., Seattle, WA (US)

(72) Inventors: Amjad Hussain, Bellevue, WA (US); Sivaprasad Venkata Padisetty, Bellevue, WA (US); Steven Merlin Twitchell, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 15/814,104

(22) Filed: Nov. 15, 2017

(51) Int. Cl.
  *H04L 12/24* (2006.01)
  *G06F 9/455* (2018.01)
  *H04L 12/26* (2006.01)

(52) U.S. Cl.
  CPC ...... *H04L 41/0803* (2013.01); *G06F 9/45558* (2013.01); *G06F 2009/4557* (2013.01); *G06F 2009/45562* (2013.01); *H04L 43/16* (2013.01)

(58) Field of Classification Search
  CPC . H04L 41/0803; H04L 43/16; G06F 9/45558; G06F 2009/45562; G06F 2009/4557
  USPC ........................................................ 709/220
  See application file for complete search history.

(56) References Cited

U.S. PATENT DOCUMENTS

| | | | | |
|---|---|---|---|---|
| 9,396,039 | B1* | 7/2016 | Arguelles | G06F 9/5083 |
| 2013/0179895 | A1* | 7/2013 | Calder | G06F 9/5077 |
| | | | | 718/104 |
| 2013/0339949 | A1* | 12/2013 | Spiers | G06F 9/45558 |
| | | | | 718/1 |
| 2015/0106612 | A1* | 4/2015 | Cao | G06F 9/4401 |
| | | | | 713/2 |
| 2015/0281032 | A1* | 10/2015 | Bragstad | H04L 65/80 |
| | | | | 709/219 |

FOREIGN PATENT DOCUMENTS

WO    WO-2012163093 A1 * 12/2012 ......... H04L 41/0893

* cited by examiner

*Primary Examiner* — Zi Ye
(74) *Attorney, Agent, or Firm* — Lowenstein Sandler LLP

(57) ABSTRACT

A system for managing configuration of multiple computing systems associated with a customer in a cloud computing environment. A command associated with the desired configuration is identified for execution on a total quantity of instances associated with the customer system to be configured. An invocation rate parameter selected by the customer system is used to control a rate in which the configuration command is invoked on the targeted instances. Based on the invocation rate parameter, the system invokes the configuration command on identified portions or sets of the targeted instances during different stages of the configuration invocation.

20 Claims, 7 Drawing Sheets

CONFIGURATION INVOCATION MANAGEMENT

BACKGROUND

A customer system may manage multiple resources (e.g., computing devices or managed) or instances in a cloud computing environment. For example, the customer system may wish to perform a change (e.g., a configuration) to the multiple managed instances using a centralized system. Implementing wide-scale changes, however, can be dangerous. In certain cases, the desired change can have an unintended and negative effect on the managed instances. The impact of the invocation on many instances at one time, without sufficient safety controls, can result in considerable instability in a customer's fleet.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

Figure 1:
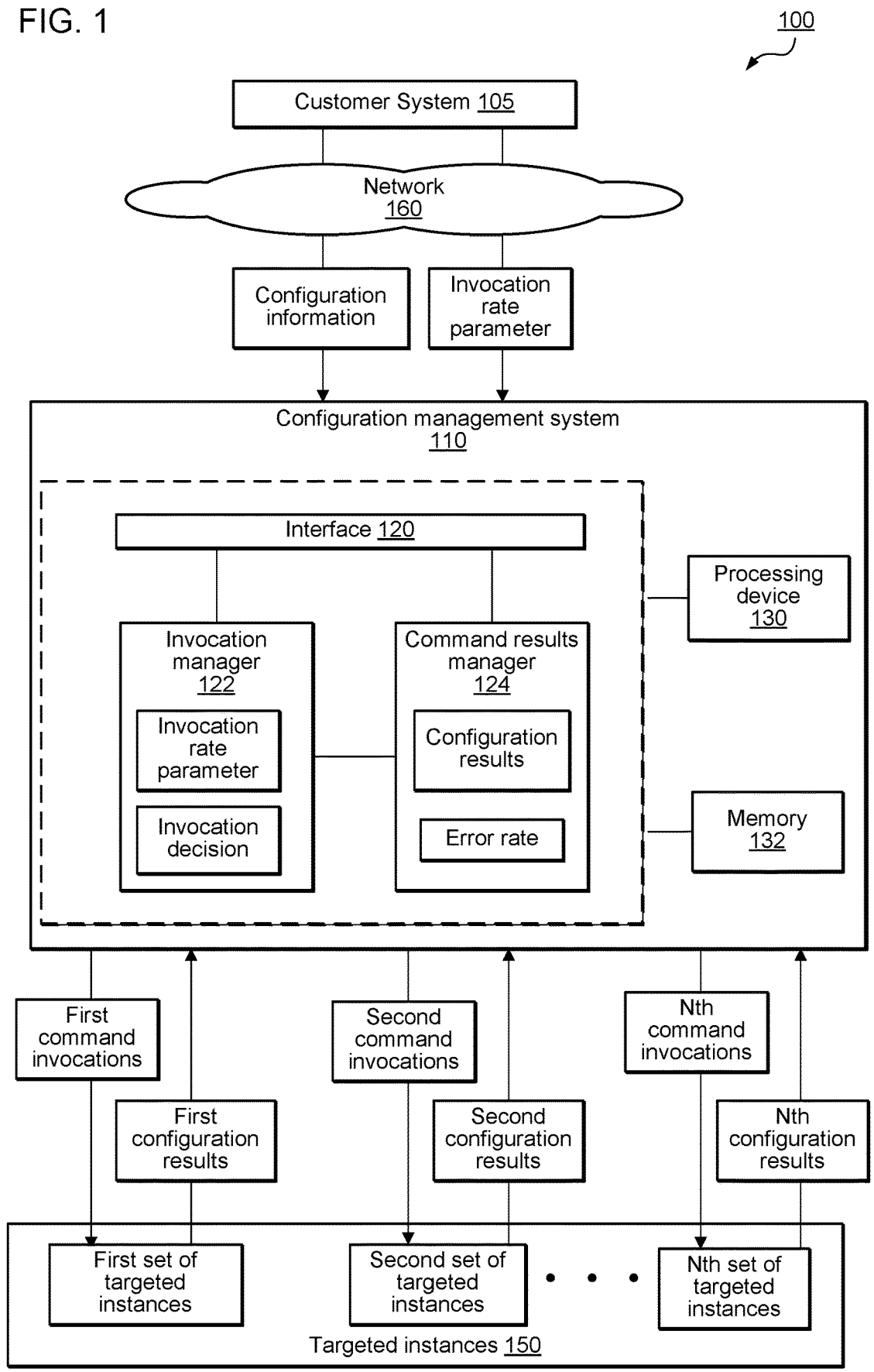
FIG. 1 illustrates an example application deployment environment including a configuration management system, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to managing configuration of multiple computing systems (also referred to as "managed instances" or "instances") associated with a customer in a cloud computing environment. In one embodiment, instances are virtual machines in a cloud computing environment. In one embodiment, a command associated with a desired configuration is identified for execution on a total quantity of instances associated with a customer system to be configured (also referred to as "target instances"). For example, the configuration may include any update, change, addition, or modification to a targeted instance, such as, configuring an on-instance firewall, updating an application on an instance, executing a script on an instance, etc. In one embodiment, a system (also referred to as the "configuration management system") is provided to manage the configuration of the managed instances in accordance with an invocation rate parameter (also referred to as a "rate parameter") selectable by the customer (also referred to as the "customer system"). In one embodiment, the invocation rate parameter is used to control a rate in which the configuration command is invoked on the targeted instances. In one embodiment, customers load sophisticated and/or customized velocity control using serverless functions hosted in an invocation management service. The customized velocity control may control the rate in which the configuration command is invoked on targeted instances. In one embodiment, based on the invocation rate parameter, the configuration management system invokes the configuration command on identified portions or sets of the targeted instances during different stages of the configuration invocation (also referred to as "invocation stages"). In one embodiment, the quantity of instances in each set (e.g., any number of instances, including one instance) to receive the configuration command during an invocation stage is identified based at least in part on the invocation rate parameter or invocation decision received from a service executing the customer-supplied velocity function. In one embodiment, the rate parameter includes a mathematical expression, function, or a set of rules or constraints used to calculate a quantity of instances to receive the configuration command during a subsequent or next invocation stage (e.g., in a time period). Advantageously, in one embodiment, the customer-selected invocation rate parameter may be applied to establish a multi-stage configuration invocation plan to control a quantity of targeted instances to receive the configuration command at each stage of the configuration plan.

In one embodiment, the configuration management system applies the invocation rate parameter to identify a first set of the targeted instances to receive the configuration command in a first stage. After the first stage of invocations successfully completes, the configuration management system uses the invocation rate parameter to determine a second set of the targeted instances to receive the configuration command. In one embodiment, based on the invocation rate parameter, the total quantity of targeted instances and a level of performance associated with the command invocations, the configuration management system iteratively executes a number of invocation stages until the configuration has been completed for the total quantity of targeted instances.

In one embodiment, after the completion of each stage of the command invocations, the command management system determines a performance level associated with the particular stage. In one embodiment, the performance level may be a measurement of a quantity or rate of errors identified in connection with the command invocation on a set of targeted instances. For example, a result code may be determined by the configuration management system in connection with the invocation of a configuration command on a first set of targeted instances. In one embodiment, the result code may represent a level or quantity or rate of errors corresponding to the particular invocation stage. An error rate may be a quantity of errors per stage and/or per time unit. For example, the result code may be a zero-valued result code representing a "success" status for the invocation stage, or a non-zero valued result code exceeding an acceptable error threshold value thus representing a "fail" status for the invocation stage. In one embodiment, the result code may be a non-zero valued result code indicating the occurrence of one or more errors. In this example, a quantity of errors (or error rate) identified in connection with the invocation stage may identified. In one embodiment, the error rate of an invocation stage may be compared to an error rate threshold value to determine a performance level for the invocation stage. In one embodiment, the error rate threshold value may be identified as part of the invocation rate parameter selected by the customer system. In one embodiment, advantageously, the customer system (e.g., the customized velocity control loaded into the invocation management service) may customize the acceptable level of errors for one or more of the invocation stages. In one embodiment, the invocation rate parameter may identify multiple different error rate threshold values, wherein a different error rate threshold value may be selected for different types of configuration commands, different invocation stages, different types of targeted instances, or a combination thereof.

In one embodiment, the configuration command system and/or customized invocation management code loaded into an invocation management service employs the invocation rate parameter and the performance level data associated with each invocation stage (e.g., each set or portion of targeted instances on which the command was invoked) to determine a command invocation decision. In one embodiment, the command invocation decision may include a termination of further command invocations (i.e., the sending of the command invocation to further sets of targeted instances is terminated), a length of time to delay before initiating a subsequent invocation stage (also referred to as the "invocation delay period"), and/or an identification of a next set of targeted instances to send the configuration command in a subsequent invocation stage. In one embodiment, each invocation stage may include a set or quantity of targeted instances identified based on the invocation rate parameter selected by the customer system and a performance level associated with a previous invocation stage. Advantageously, the customized and monitored control of the invocation stages enables a customer system to manage the remote execution of configuration commands impacting a number of managed instances in a manner that limits a blast radius associated with any unintended effects.

Some embodiments are discussed with reference to invocation stages. In one embodiment, an invocation stage includes a specified number of instances and completes when the specified number of instances are configured. In one embodiment, the invocation stage may include the invoking the configuration command on a single instance (e.g., replacing an instance upon which the command was recently invoked and completed) or any number of instances less than or equal to the total number of targeted instances. In one embodiment, an invocation stage is defined temporally, and is based on the configuration information gathered over a period of time. For example, an invocation rate parameter may specify that X number of instances are to be configured in parallel, and upon completion of the configuration on one instance, another instance may be configured to maintain X number of instances that are being configured in parallel, pursuant to the invocation rate parameter. Accordingly, a particular invocation stage may include configuration of one or more first instances started at a first time as well as configuration of second instances started at a second time after the first time.

Advantageously, according to embodiments of the present disclosure, customer systems are able to control the number of instances executing commands simultaneously based on a variety of criteria, including, for example, the total number of targeted instances, the rate that the command is failing in the fleet, and what the command is actually doing. For example, commands that change firewall rules may make hosts unreachable, so customers may want to run those commands very slowly at first. In another example, commands that return an indication of whether some process is running on each instance may be run at a higher rate (e.g., at a highest rate available based on the rate at which the invocations can be dispatched), but terminate the invocation processing after X number of failures (e.g., after a tenth failure) so the customer system can fix the query and try again without waiting for the command to finish running across the entire fleet of instances.

According to another example, the customer system may establish velocity controls (e.g., by way of the establishment of code executed by a service) to ramp up or increase the number of simultaneous invocations as more and more instances complete the command successfully and confidence in the effects of the command increases. In another example, the customer system may establish velocity controls to reduce the number of simultaneous invocations when there have been a certain threshold number of random failures. In another example, the customer system may establish velocity controls to run a command on a limited number of instances, followed by the initiating of a notification to enable a user (e.g., an engineer interacting with the customer system) to manually verify that there were no unintended effects before provide an instruction to resume command execution on the rest of the targeted instances in the fleet. In yet another example, the customer system may select a random sample of data from the fleet and stop after a threshold percentage eof instances in the fleet have replied (e.g., 15% of instances in the fleet), regardless of whether the command has failed on any of the instances.

FIG. 1 is a block diagram illustrating various components of a cloud computing environment 100 including a customer system 105 operatively coupled to a configuration management system 110 configured to manage the configuration of multiple instances (i.e., targeted instances 150) associated with the customer system 105. In one embodiment, the targeted instances 150 may be virtual computing instances or computing devices operating in a cloud-based computing environment or on-premises environment configured to operatively connect with the configuration management system 110. In one embodiment, the configuration management system 110 includes one or more computing devices (e.g., servers) configured to perform various functions associated with the configuration of the targeted instances 150 on behalf of the customer system 105, as described in detail herein. In one embodiment, the configuration management system 110 is the Amazon® Elastic Compute Cloud (EC2) Systems Manager) including one or more Amazon® Lambda functions configured to perform the configuration management operations described herein. In one embodiment, the targeted instances 150 may each include a software agent configured to enable communications with the configuration management system 110 to implement the capabilities and functions described herein.

In one embodiment, the configuration management system 110 may include one or more components, services, modules, execution engines, applications, programs, etc. configured to perform the various functionalities described herein. In one embodiment, the configuration management system 110 may include an interface 120, an invocation manager 122, and a command results manager 124, as described below. In one embodiment, the configuration management system 110 may further include a processing device 130 and a memory 132 configured to execute and store instructions associated with the functionality of the various components, services, modules, execution engines, applications, and programs of the configuration management system 110, as described in greater detail below in connection with FIGS. 2-5. In one embodiment, the interface 120 of the configuration management system 110 provides a portal to facilitate communications with the customer system 105 via a network 160. In one embodiment, the network 140 may be any suitable network, including, for example, the Internet, intranets, extranets, wide area networks (WANs), local area networks (LANs), wired networks, wireless networks, or other suitable networks, etc., or any combination of two or more such networks.

In one embodiment, the interface 120 is configured to receive configuration information including an identification of a desired configuration and a total quantity of managed instances 150 that are to be configured according to the identified configuration. In one embodiment, the identified configuration may be selected by the customer system 105 via the interface 120 (e.g., a graphical user interface configured to present one or more selectable configuration commands) from a library of available configuration commands (e.g., an executable instruction or set of instructions that produces a configuration of a targeted instance).

In one embodiment, the configuration management system 110 receives information from the customer system 105 identifying an invocation rate parameter associated with the identified configuration. In one embodiment, the invocation rate parameter includes a set of instructions, rules, parameters, etc. that may be used by the invocation manager 122 of the configuration management system 110 to control and manage the rate of invocation associated with the identified configuration as it applies to the total quantity of targeted instances 150. In one embodiment, the invocation manager 122 is a function configured to use the selected invocation rate parameter to identify a first stage of command invocations. In one embodiment, the first stage includes invoking the identified command (referred to in FIG. 1 as the "first command invocations") on a first portion of subset of the targeted instances 150 (referred to in FIG. 1 as the "first set of targeted instances"). In one embodiment, during the first stage, a set of results corresponding to the first command invocations on the first set of targeted instances is identified by the command results manager 124 of the configuration management system 110.

In one embodiment, the command results manager 124 receives and processes the configuration results produced in connection with each of the multiple invocation stages (e.g., the first invocation stage, the second invocation stage, the Nth invocation stage). In one embodiment, the configuration results (e.g., the first configuration results, the second configuration results, the Nth configuration results) corresponding to each invocation stage may identify one or more errors that correspond to each of the command invocations (e.g., the first command invocations, the second command invocations, the Nth command invocations). In one embodiment, the configuration results identify a type of error and a quantity of errors corresponding to stage of command invocations.

In one embodiment, the command results manager 124 analyzes the configuration results to determine an error rate corresponding to a particular set of command invocations (e.g., the first command invocations, the second command invocations, the Nth command invocations). In one embodiment, the error rate corresponding to an invocation stage is provided by the command results manager 124 to the invocation manager 122. In one embodiment, the invocation manager 122 uses the error rate information and the invocation rate parameter to generate an invocation decision. In one embodiment, the invocation decision includes a determination of a next set or quantity of targeted instances to receive the configuration command in a subsequent invocation stage (e.g., a second invocation stage, an Nth invocation stage, etc.).

In one embodiment, the quantity of instances in a next set of targeted instances is determined based on the invocation rate parameter and the error rate associated with the previous invocation stage. In one embodiment, the invocation rate parameter may include one or more rules or functions that may be used to calculate a quantity of targeted instances for the subsequent set of targeted instances. In one embodiment, the invocation rate parameter may include a function that is based on the error rate of the previous invocation stage. For example, the invocation rate parameter may indicate that a first quantity (X) of instances are to receive the next command invocations (e.g. the second command invocations) if the error rate associated with the invocation stage (e.g., the first command invocations) is less than or equal to an error rate threshold value. In this example, the invocation rate parameter may indicate that a portion or percentage of the first quantity (e.g., ½ of X) is to receive the next command invocations if the error rate exceeds the error rate threshold value. In another example, the invocation rate parameter may include a function wherein the number of instances is increased exponentially for each successive invocation stage in the event that the error rate for each of the previous invocation stages is below the error rate threshold value. For example, the invocation rate parameter may indicate that for each successful command invocation (i.e., with an error rate below the error rate threshold value) in a first invocation stage, two more command invocations are launched in a subsequent invocation stage (e.g., a second invocation stage).

In one embodiment, the invocation rate parameter may include a function wherein the invocation decision is to terminate any further command invocations if the error rate exceeds the error rate threshold value. In one embodiment, the invocation rate parameter may include a function wherein the invocation decision is to establish an invocation delay period. For example, the invocation rate parameter may be used to determine the invocation delay period as a function of the error rate, wherein a larger invocation delay period is applied for a subsequent invocation stage if a relatively high error rate (e.g., an error rate within a certain range of the error rate threshold) is identified in connection with a previous invocation stage.

In one embodiment, the invocation manager 122 iteratively applies the invocation rate parameter and error rate information associated with a completed invocation stage (e.g., the execution of a set of command invocations on a set of targeted instances) to determine a next set of targeted instances to execute the next set of command invocations. In one embodiment, the invocation manager 122 may continue the processing of the invocation stages based at least in part on the invocation rate parameter until the configuration command has been invoked on the total quantity of targeted instances.

Figure 2:
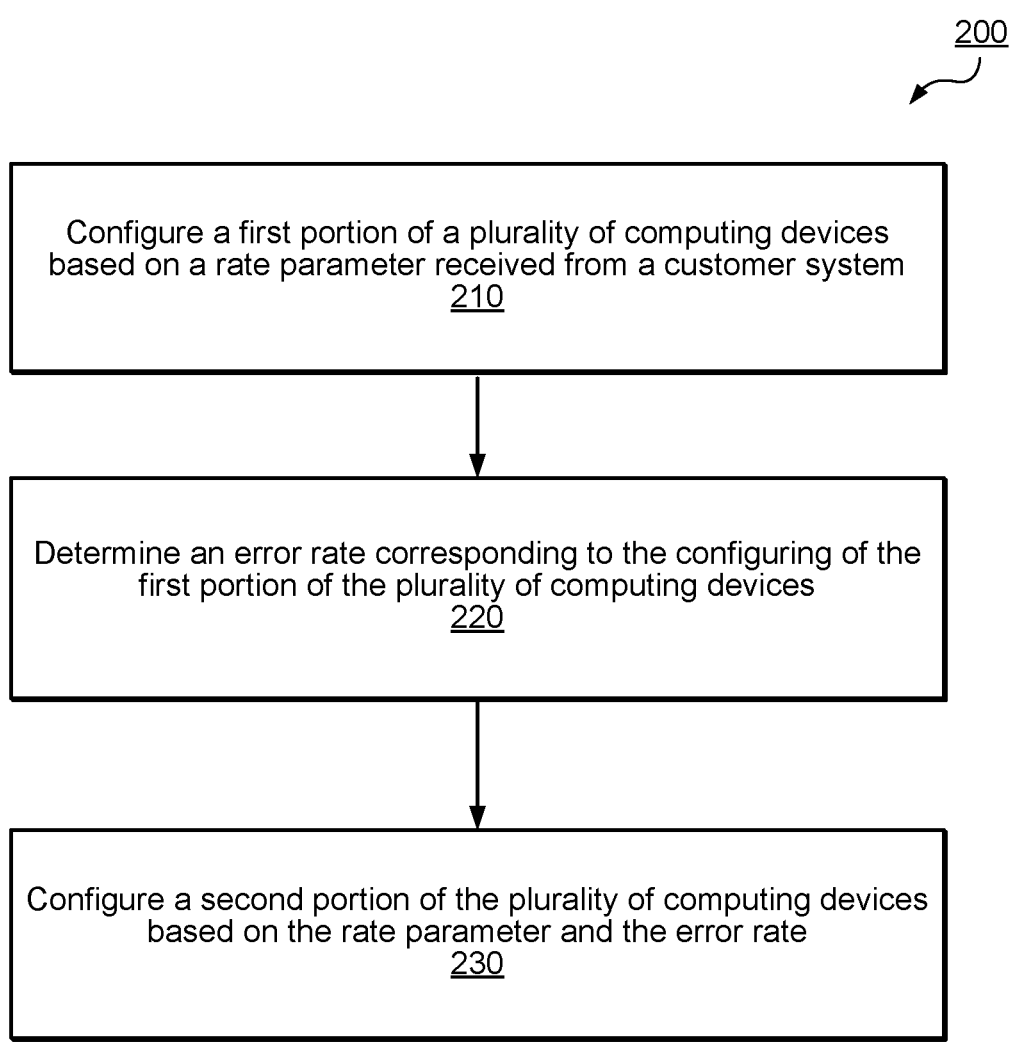
FIG. 2 is a flow diagram illustrating one embodiment of a configuration management process, according to one embodiment.

FIG. 2 illustrates a flowchart that provides an example of a process 200 executable by a configuration management system (e.g., configuration management system 110 of FIG. 1), according to various embodiments. It is understood that the flowchart of FIG. 2 provides an example of the many different types of functional arrangements that may be employed to implement the operation and functionality of a configuration management system, as described herein. In one embodiment, the configuration management system executes the method 200 to invoke a configuration command on a total set of identified instances (e.g., virtual computing systems associated with a customer) in multiple stages, wherein a quantity of instances on which the command is invoked during each stage is determined based on an invocation rate parameter established by the customer.

In block 210, a first portion or set of computing devices (e.g., virtual computing devices or instances) associated with a customer system are configured based on an invocation rate parameter (also referred to as the rate parameter) received from the customer system. In one embodiment, the configuration management system identifies configuration information including a total number of computing devices to be configured and the invocation rate parameter. In one embodiment, in block 210, the configuration management system analyzes the rate parameter to determine the first portion of the total quantity of computing devices to configure during an initial invocation stage. In one embodiment, the configuration management system uses the rate parameter including a mathematical expression, function, or a set of rules or constraints to calculate the quantity of computing devices of the first portion.

In one embodiment, the configuration management system may include a function that is called by the customer system in connection with an executable instruction corresponding to a configuration command. In one example, the customer system includes a reference to the function to cause the calling and executing of the function after each invocation stage completes to determine a quantity of instances for a next invocation stage.

In block 220, the configuration management system determines an error rate corresponding to the configuring of the first portion of the plurality of computing devices. In one embodiment, zero errors associated with the configuration of the first portion of the computing devices may be determined, and as such, the error rate for that invocation stage is also zero. In one embodiment, if one or more errors are identified, a corresponding error rate is determined. In one embodiment, the error rate may be a number or count of total errors, a ratio of the number of errors to the number of computing devices in the first portion, or other expression representing the errors associated with an invocation stage. In one embodiment, if the error rate associated with configuring the first portion of computing devices is zero or a value below an error rate threshold value, the method 200 may proceed to block 230. Alternatively, for example, if the error rate determined in block 220 is above an error rate threshold value, the method 200 may end, such that no further computing devices are configured in accordance with the identified configuration command.

In block 230, the configuration management system configures a second portion of the plurality of computing devices based on the rate parameter and the error rate. In one embodiment, the quantity of computing devices in the second portion is identified by applying the rate parameter in view of the error rate. In one embodiment, the rate parameter may indicate a quantity of computing devices to include in a next invocation stage as a function of the error rate. For example, the rate parameter may indicate that the second portion is to include a first quantity (X) of computing devices if the error rate is zero. In another example, the rate parameter may indicate a second quantity (X/2) of computing devices if the error rate is a non-zero value within a first range. In yet another example, the rate parameter may indicate a third quantity (X/4) of computing devices if the error rate is a non-zero value within a second range (e.g., wherein the second range includes values that are higher than the values in the first range). Advantageously, the performance level (e.g., as represented by the error rate) of a previous invocation stage (e.g., the configuring of a first portion of computing device) and the customer-selected rate parameter are applied by the configuration management system to determine a quantity of computing devices in a second portion to configure in a subsequent invocation stage.

Figure 3:
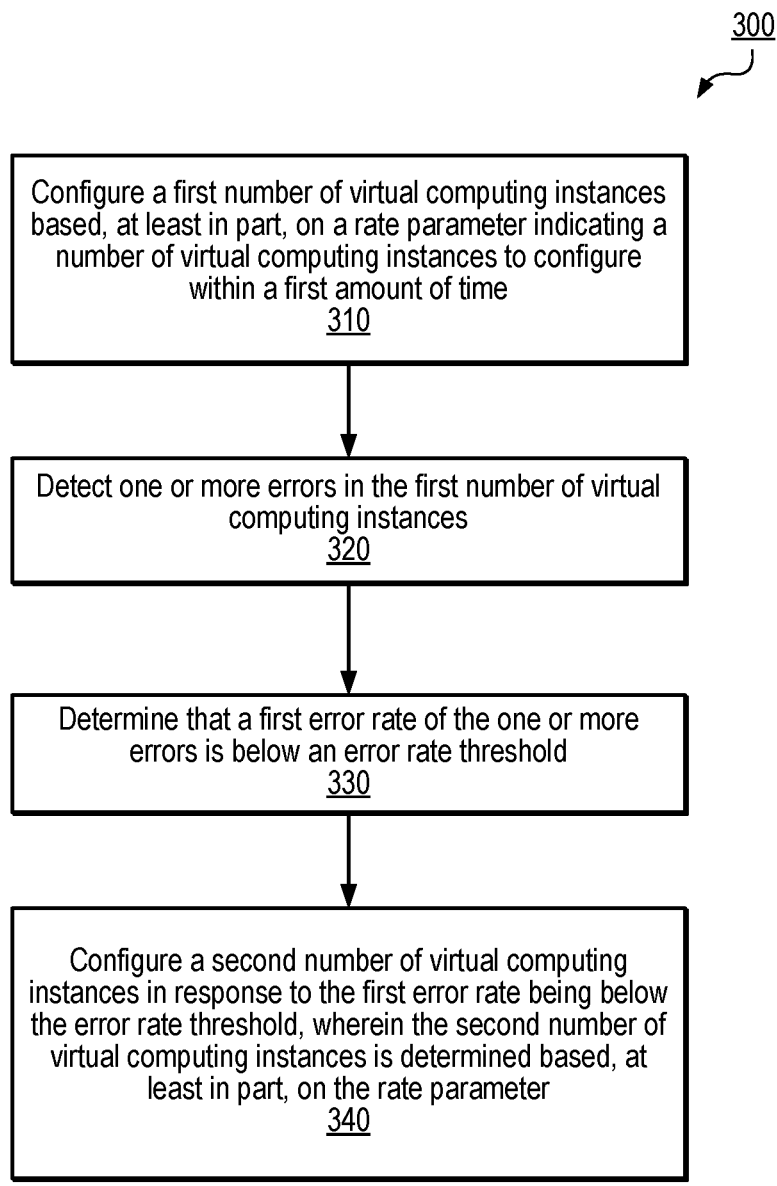
FIG. 3 is a flow diagram illustrating one embodiment of a configuration management process, according to one embodiment.

FIG. 3 illustrates a flowchart that provides an example of a process 300 executable by a configuration management system (e.g., configuration management system 110 of FIG. 1), according to various embodiments. It is understood that the flowchart of FIG. 3 provides an example of the many different types of functional arrangements that may be employed to implement the operation and functionality of a configuration management system, as described herein. In one embodiment, the configuration management system executes the method 300 to invoke a configuration command on a total set of identified instances (e.g., virtual computing systems associated with a customer) in multiple stages, wherein a quantity of instances on which the command is invoked during each stage is determined based on an invocation rate parameter established by the customer.

In block 310, a first number of virtual computing instances associated with a customer system is configured based, at least in part, on a rate parameter indicating the first number to configure within a first amount of time (e.g., with a first invocation stage). In one embodiment, the rate parameter is selected or identified by a customer system along with configuration information (e.g., the configuration command to be invoked, the total number of virtual computing instances to be configured, etc.). For example, the rate parameter may include a function that may be applied by the configuration management system to determine a number of virtual computing instances to configure during each amount of time or invocation stage.

In block 320, a quantity of errors in the first number of errors associated with the configuring of the first number of virtual computing instances is detected. In one embodiment, the quantity of errors may be zero or any non-zero value. In one embodiment, if an error is detected, a type or category of the error may be determined (e.g., a low severity error, a high severity error, etc.)

In block 330, a first error rate associated with the one or more errors is determined to be blow an error rate threshold. In one embodiment, the first error rate may be any suitable mathematical representation of the one or more errors detected in block 320. For example, the first error rate may be a percentage of errors as a function of the first number of virtual computing instances or an integer value representing the total number of errors detected during the first invocation stage. In one embodiment, the error rate threshold may be a value or range of values determined by the configuration management system or selected by the customer system. In one embodiment, the error rate threshold may be variable, such that it is a function of a particular invocation stage or error type (e.g., error severity level). For example, the error rate threshold value may be a first value for a first invocation stage, a second value for a second invocation stage, and so on. In another example, the error rate threshold value may be a first value for one or more errors associated with a first error type (e.g., low severity errors), a second value for one or more errors associated with a second error type (e.g., medium severity errors), and a third value for one or more errors associated with a third error type (e.g., high severity errors).

In block 340, a second quantity or number of virtual computing instances are configured in response to the first error rate being below the error rate threshold. In one embodiment, in block 340, the second number of virtual computing systems is determined based, at least in part, on the rate parameter. In one embodiment, the configuration management systems determines that the first invocation stage (e.g., the configuring of the first number of computing devices) was completed successfully (e.g., the associated error rate was below the error rate threshold) and applies the rate parameter to determine the second number of virtual computing instances to be configured in a second amount of time (e.g., during the second invocation stage). In one embodiment, the blocks in method 300 may be performed iteratively until the total number of virtual computing instances are configured in accordance with the configuration command and at a rate determined based on the customer-selected rate parameter and performance level (e.g., the error rates for the respective invocation stages).

Figure 4:
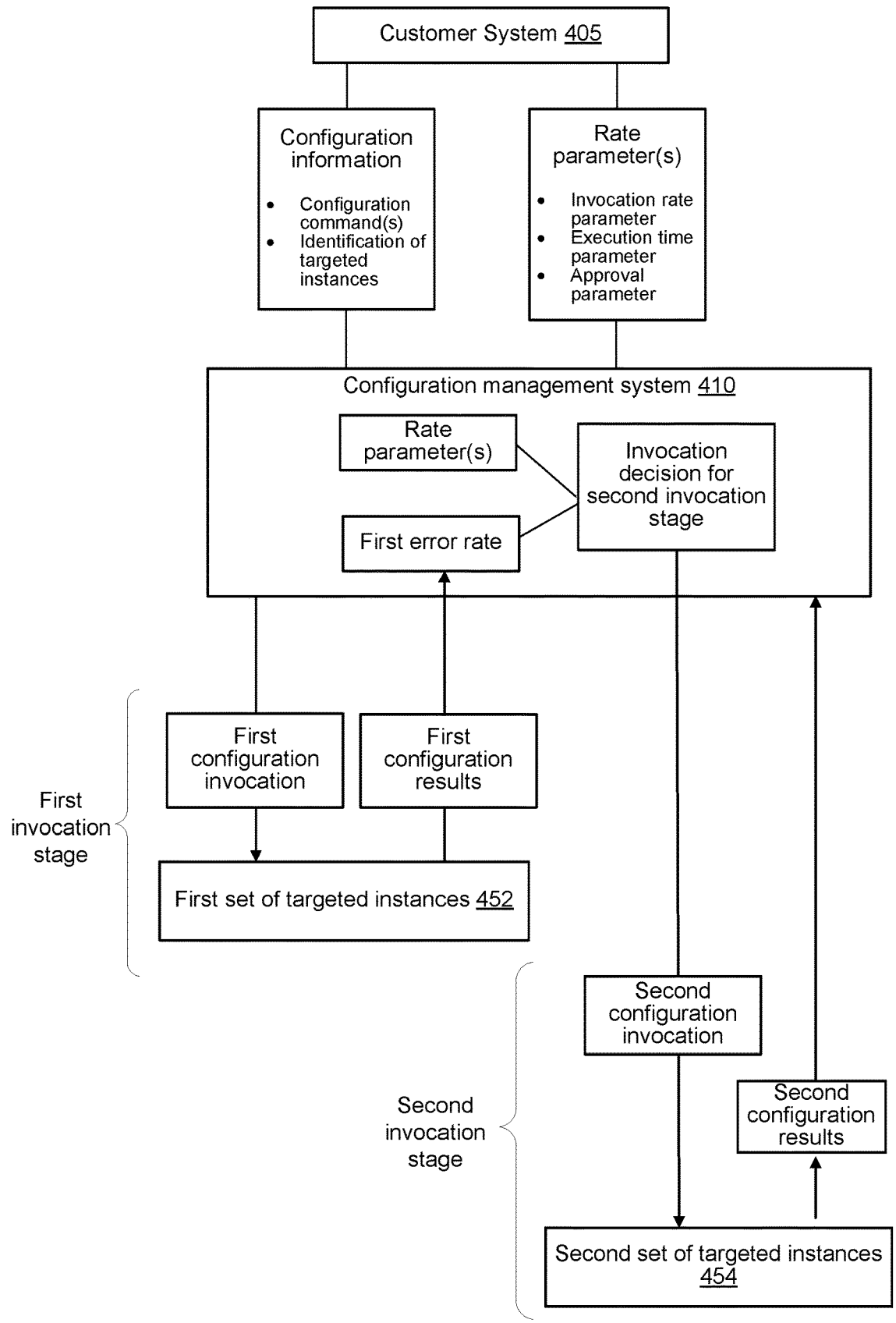
FIG. 4 is a block diagram illustrating a configuration management system to manage invocation of a configuration on a set of computing devices associated with a customer system, according to one embodiment.

FIG. 4 illustrates an example implementation of a configuration management system 410 to invoke configuration commands on behalf of an operatively coupled customer system 405. As illustrated, the customer system 405 and the configuration management system 410 cooperate to identify configuration information and one or more rate parameters associated with a configuration deployment plan for multiple managed instances (e.g., virtual computing systems) associated with the customer system. In one embodiment, the configuration information includes one or more configuration commands to be executed on behalf of the customer system 405 and an identification of the targeted instances to be configured according to the one or more identified configuration commands.

In one embodiment, one or more rate parameters associated with the configuration information are identified. In one embodiment, the rate parameters may an invocation rate parameter, an execution time parameter, an approval parameter, or a combination thereof. In one embodiment, the invocation rate parameter provides a model or plan for use in determining a quantity or number of targeted instances to configure during each of the invocation stages. For example, as shown in FIG. 4, an invocation rate parameter may be used to determine the first set of targeted instances to receive the first configuration invocation during the first invocation stage. Furthermore, as shown in FIG. 4, the invocation rate parameter may be used to determine the second set of targeted instances to receive the second configuration invocation during the second invocation stage.

In one embodiment, the rate parameter may be an execution time parameter that defines a value or range of values of an acceptable execution time associated with an invocation stage. For example, the execution time parameter may indicate a maximum execution time for the completion of an invocation stage. In this example, the configuration management system 410 may determine an appropriate number of targeted instances to be configured during an invocation stage such that the maximum execution time is not exceeded.

In one embodiment, the rate parameter may be an approval parameter that defines a level of approval that is required before a subsequent invocation stage is performed. For example, the approval parameter may establish a rule wherein a notification is to be sent to the customer system 405 following the completion of an invocation stage. In this example, the approval parameter may further indicate that a confirmation or response indicating approval is to be received by the configuration management system 410 prior to entering a subsequent invocation stage.

In one embodiment, the configuration management system 410 initiates the first invocation stage wherein a first configuration invocation (corresponding to the one or more configuration commands) is performed with respect to the first set of targeted instances identified based on the one or more customer-selected rate parameters. During the first invocation stage, first configuration results are identified and used to determine a first error rate.

As shown in FIG. 4, the first error rate and the one or more rate parameters are analyzed to generate an invocation decision for a second invocation stage. In one embodiment, as shown in FIG. 4, the invocation decision includes an identification of a set or number of targeted instances 454 to receive the second configuration invocation during the second invocation stage. In one embodiment, the invocation decision may further include an invocation delay period (e.g., a length of time to delay before initiating the next invocation stage (e.g., the second invocation stage in FIG. 4)). In one embodiment, the configuration management system 410 may determine the invocation delay period based on the configuration results associated with the previous stage, the one or more rate parameters selected by the customer system (e.g., the invocation rate parameter, the execution time parameter, the approval parameter, or a combination thereof).

In one embodiment, based on the invocation decision, the second configuration invocation is performed with respect to the second set of targeted instances 454. In one embodiment, second configuration results corresponding to the configuration of the second set of targeted instances are collected by the configuration management system 410. In the example shown in FIG. 4, two invocation stages are performed, however, it is to be appreciated that any number of invocation stages may be performed by the configuration management system 410 until either all of the identified targeted instances have been configured or the configuration process is terminated (e.g., due to a level of errors exceeding an error rate threshold).

Figure 5:
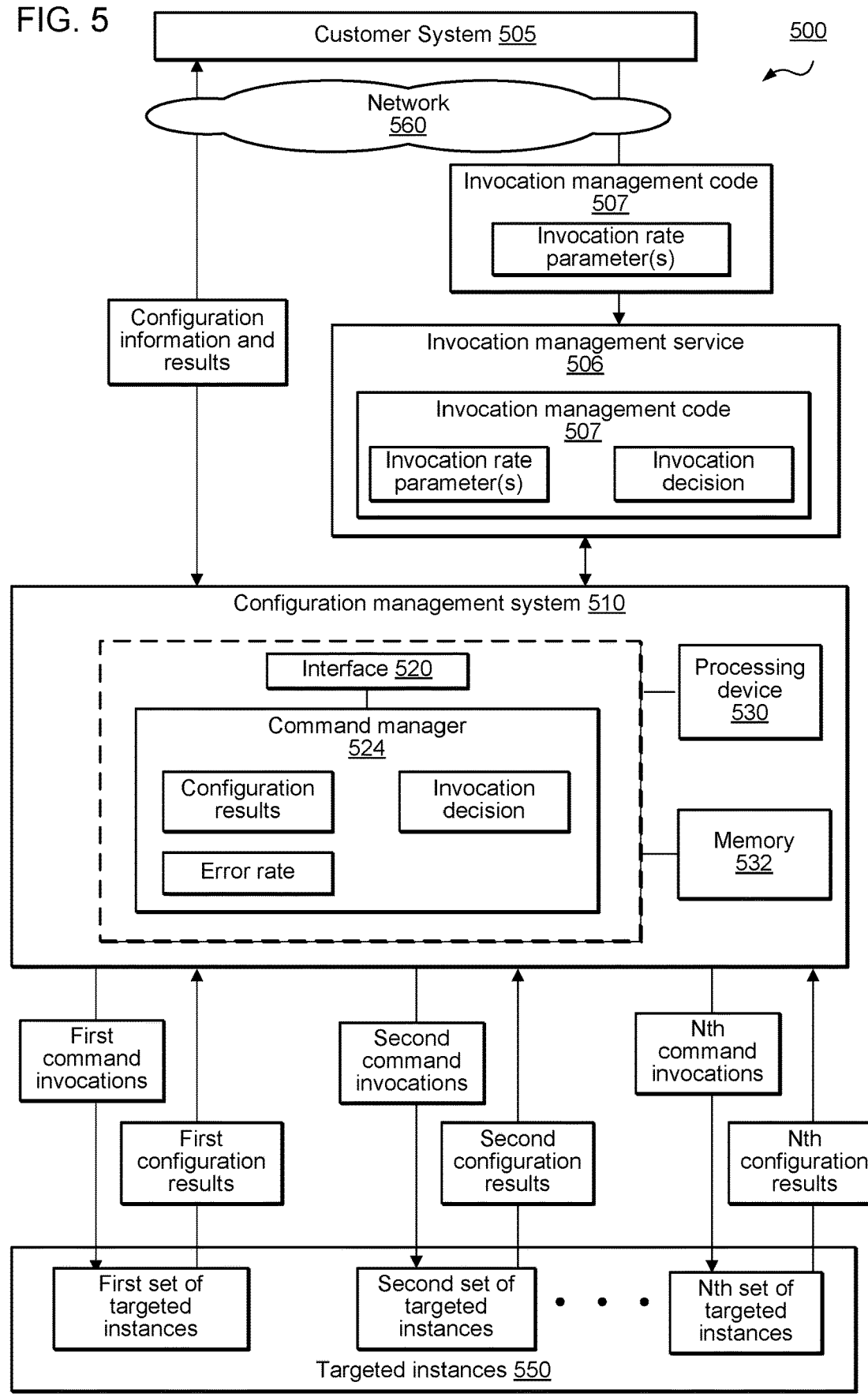
FIG. 5 illustrates an example application deployment environment including a configuration management system, according to one embodiment.

FIG. 5 is a block diagram illustrating various components of a cloud computing environment 500 including a customer system 505 operatively coupled to an invocation management service 506 and a configuration management system 510 configured to manage the configuration of multiple instances (i.e., targeted instances 550) associated with the customer system 505. In one embodiment, the targeted instances 550 may be virtual computing instances or computing devices operating in a cloud-based computing environment or on-premises environment configured to operatively connect with the configuration management system 510. In one embodiment, the configuration management system 510 includes one or more computing devices (e.g., servers) configured to perform various functions associated with the configuration of the targeted instances 550 on behalf of the customer system 505, as described in detail herein. In one embodiment, the configuration management system 510 is the Amazon® Elastic Compute Cloud (EC2) Systems Manager) configured to perform the configuration management operations described herein. In one embodiment, the targeted instances 550 may each include a software agent configured to enable communications with the configuration management system 510 to implement the capabilities and functions described herein.

In one embodiment, the customer system 505 provides an invocation management service 506 with invocation management code 507 configured to include instructions, rules, policies, controls, etc. to generate invocation decisions corresponding to various stages of configuration command invocations to be sent to the targeted instances 550. In one embodiment, the invocation management code 507 is customized and executed on behalf of the customer system 505 to enable the customer system 505 to generate invocation decisions and provide the invocation decisions to the configuration management system 510 for distribution to a desired set of targeted instances.

In one embodiment, the configuration management system 510 includes one or more Amazon® Lamba functions providing an execution platform configured to execute the customer system-supplied invocation management code 507 including one or more invocation rate parameters to generate an invocation decision for each invocation stage associated with the configuration of the target instances 550. As shown in FIG. 5, the invocation management code 507 and one or more invocation rate parameters are provided by the customer system 505 to the invocation management service 506. In one embodiment, the invocation management service 506 may be hosted by one or more computing devices (e.g., one or more servers or virtual computing devices) that operate within the customer system 505, hosted by one or more computing devices (e.g., one or more servers or virtual computing devices) that operate within the configuration management system 510, or operate as a standalone service.

In one embodiment, the customer system 505 sends configuration information to the configuration management system 510. In one embodiment, the configuration information includes a configuration command indicating a type of desired configuration and an identification of the targeted instances 550 to be configured. In one embodiment, the configuration management system 510 processes the configuration information and the invocation decision received from the invocation management service to send command invocations (e.g., first command invocations, second command invocations, Nth command invocations) to the sets of targeted instances (e.g., the first set of targeted instances, the second set of targeted instances, the Nth set of targeted instances) via a messaging service or interface. In one embodiment, the configuration management system 110 may further include a processing device 530 and a memory 532 configured to execute and store instructions associated with the functionality of the various components, services, modules, execution engines, applications, and programs of the configuration management system 510, as described herein with respect to FIGS. 5 and 6.

In one embodiment, in response to receipt of the configuration information, the configuration management system 510 executes a call to the invocation management service 506. In one embodiment, the configuration management system 510 includes an interface 520 configured to execute the call to the invocation management service 506 (in response to receipt of the configuration information from the customer system 505) and receives the invocation decision from the invocation management service 506. In one embodiment, the call includes at least a portion of the configuration information (e.g., a total number of targeted instances 550, a number of invocations that have been completed thus far, a status of the completed invocations (e.g., configuration results), etc. In one embodiment, the invocation management service 506 executes the invocation management code using the information received from the configuration management system 510 and the one or more invocation rate parameters to generate an invocation decision. In one embodiment, the invocation decision may be based, at least in part, on information relating to the customer system (e.g., customer-specific information, such as computing resource availability, maintenance schedules, administrative approval processing, or one or more customer-specific workflows)

In one embodiment, the invocation decision is provided by the invocation management service 506 to the configuration management system 510. For example, the invocation decision may include an indication of a number of instances to receive the command invocation in a next invocation stage, an instruction to terminate execution of the command invocations, a period of time to wait before calling the invocation management service 506 again for a next invocation stage, etc. In one embodiment, the invocation decision may be based, at least in part, on information relating to the customer system (e.g., computing resource availability, maintenance schedules, administrative approval processing, one or more customer-specific workflows, etc.)

In one embodiment, the configuration management system 510 executes the first command invocations in accordance with the first invocation decision received from the invocation management service 506. In view of the first command invocations, first configuration results are collected by the command manager 524 of the configuration management system 510. In one embodiment, the command manager 524 determines an error rate based on the configuration results and calls the invocation management service 506 for a next invocation decision.

In one embodiment, based at least in part on the first configuration results and the one or more invocation rate parameters, the invocation management code 506 generates a second invocation decision. In one embodiment, the second invocation decision is provided to the configuration management system 510. In one embodiment, the configuration management system 510 generates the second command invocations based on the second invocation decision and executes the second command invocations on the second set of targeted instances. In one embodiment, this process continues until all of the targeted instances 550 have been configured in accordance with the customer system-supplied invocation management code and invocation rate parameters or until the invocation management service 506 generates an invocation decision indicating termination of the configuration invocation process.

According to embodiments of the present disclosure, the environment 500 enables the customer (via the customer system 505) to provide customized velocity control for their commands using serverless functions hosted by the invocation management service 506 (e.g., Amazon® Web Service Lambda functions). In one embodiment, the customer system 505 can create customized command approval workflows (e.g., wherein the configuration management system 510 provides notifications to the customer system 505 as part of the configuration results) and velocity ramp functions represented by the invocation management code using any of suitable programming language supported by the invocation management service 506, upload the invocation management code to the invocation management service 506, and make the invocation management code 507 available to the configuration management system 510.

In one embodiment, an application programming interface (API) associated with the invocation management service 506 conforms to a schema of an API associated with the configuration management system 510. In one embodiment, the customer system 505 provides permission to the configuration management system 510 to interact with the invocation management service 506 to initiate the execution of the invocation management code 507 by calling the invocation management service 506 during invocation dispatch. In one embodiment, the customer system 505 provides a reference to the invocation management service 506 (e.g., a resource name) in the call to configuration management system 510 (e.g., as part of the configuration information), the configuration management system 510 can then call the invocation management service 506 after each invocation stage (or each individual invocation) completes to obtain the number of invocations that should be started next.

In one embodiment, in response to receiving a call including a reference to the invocation management service 506, the configuration management system 510 validates the command and confirms the customer system 505 is authorized to send the desired configuration command to the one or more targeted instances 550.

In one embodiment, as each of the targeted instances 550 completes execution of the configuration command, the targeted instance sends the configuration result code and command output to the configuration management system 510 (e.g., by calling a messaging service or interface). In one embodiment, the configuration management system 510 stores the configuration results and outputs in a data store (e.g., a database) coordinates a next invocation. In one embodiment, to execute the next invocation, the configuration management system 510 calls the invocation management service 506 and provides one or more of the following inputs: a command identifier, a document name, a definition or identification of the set of targeted instances 550, a number of instances that have been sent the command, error rate information (e.g., based on a number of instances that have returned a completion status such as successful completion, failure, execution timeout, or unreachable (e.g., the instance is shutdown). In one embodiment, in response, the invocation management service 506 executes the invocation management code 507 to generate one or more of the following outputs to be sent to the configuration management system 510: a number of instances to send the command to next (e.g., any number of remaining instances, including zero), an instruction to cancel or terminate the configuration command, an optional date-time after which the configuration management system 510 can call the invocation management service 506 again for a next invocation stage.

In one embodiment, if the output from the invocation management service 506 returns a non-zero number of instances to send the command to, the configuration management system 510 determines the one or more instances to send the next invocation commands. In one embodiment, if the invocation management service 506 returns a particular date-time to call the function again, the configuration management system 510 may generate a call marked for dispatch after the identified date-time. In one embodiment, the configuration management system 510 may process the delayed calls in the background to ensure the delayed operations are executed. After reaching the identified date-time, a call is made by the configuration management system 510 to invocation management service 506 and the configuration management system 510 resumes dispatching invocations for the command in accordance with the instructions received from the invocation management service 506.

Figure 6:
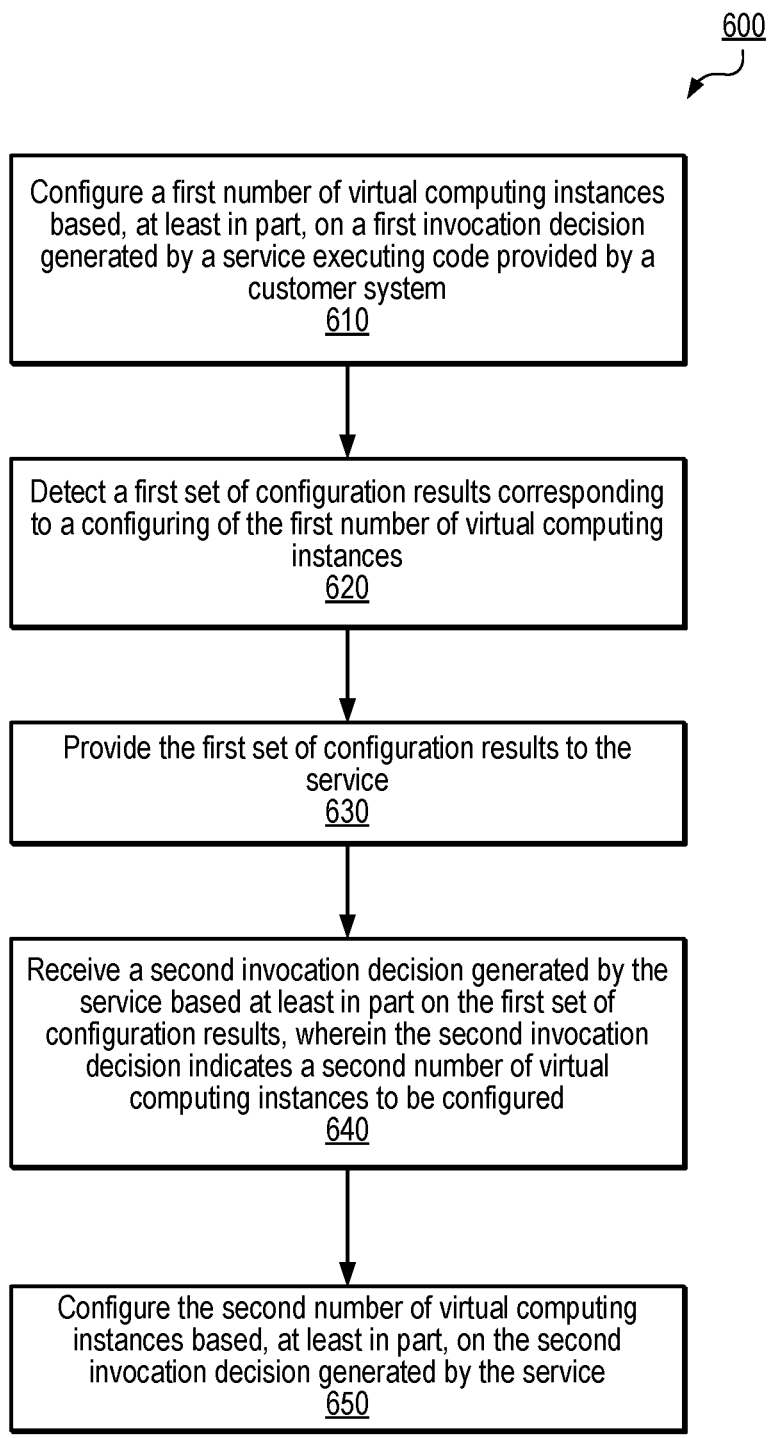
FIG. 6 is a flow diagram illustrating one embodiment of a configuration management process, according to one embodiment.

FIG. 6 illustrates a flowchart that provides an example of a process 600 executable by a configuration management system (e.g., configuration management system 510 of FIG. 5) and an invocation management service (e.g., invocation management service 506 of FIG. 5), according to various embodiments. It is understood that the flowchart of FIG. 6 provides an example of the many different types of functional arrangements that may be employed to implement the operation and functionality of a configuration management system, as described herein. In one embodiment, the configuration management system executes the method 600 to invoke a configuration command on a total set of identified instances (e.g., virtual computing systems associated with a customer) in multiple stages, wherein a number of instances on which the command is invoked during each stage is determined based on an invocation decision generated by the invocation management service (also referred to as the "service") based on code (e.g., an executable program including a set of instructions, rules, policies, etc.) provided and controlled by a customer system.

In block 610, a first number of virtual computing instances are configured based, at least in part on, a first invocation decision generated by a service executing code provided by a customer system. In one embodiment, the configuration of the first number of virtual computing instances (e.g., any number from 1 to a total number of targeted computing instances) is performed by invoking a configuration command on the instances in a first invocation stage. In one embodiment, the configuration management system executes the configuration command on the first number of virtual computing instances by calling the service to obtain the first invocation decision, wherein the first invocation decision identifies the first number of virtual computing instances to be targeted.

In block 620, a first set of configuration results corresponding to a configuring of the first number of virtual computing instances is detected. In one embodiment, the first set of configuration results include an identification of one or more errors associated with configuring the first number of virtual computing instances, an error rate associated with configuring the first number of virtual computing instances, a status associated with configuring the first number of virtual computing instances (e.g., a success status, a fail status, a timed out status, etc.).

In block 630, the first set of configuration results are provided to the service. In one embodiment, based at least in part on the first set of configuration results, the service executes the code to generate a second invocation decision. In one embodiment, the second invocation decision indicates a second number of virtual computing instances to be configured in a next invocation stage. In block 640, the second invocation decision is received by configuration management system.

In block 650, the configuration management system configures the second number of virtual computing instances based, at least in part, on the second invocation decision generated by the service. In one embodiment, the configuration of the second number of virtual computing instances (e.g., any number from 1 to a number of remaining computing instances in the total number of instances to be configured) is performed by invoking the configuration command on the instances in a second invocation stage. In one embodiment, blocks 620 through 650 may be performed iteratively (e.g., for a third, fourth, Nth invocation stage) until all of the total number of instances have been configured or until an invocation decision is generated that indicates the configuration processing is to be terminated.

Figure 7:
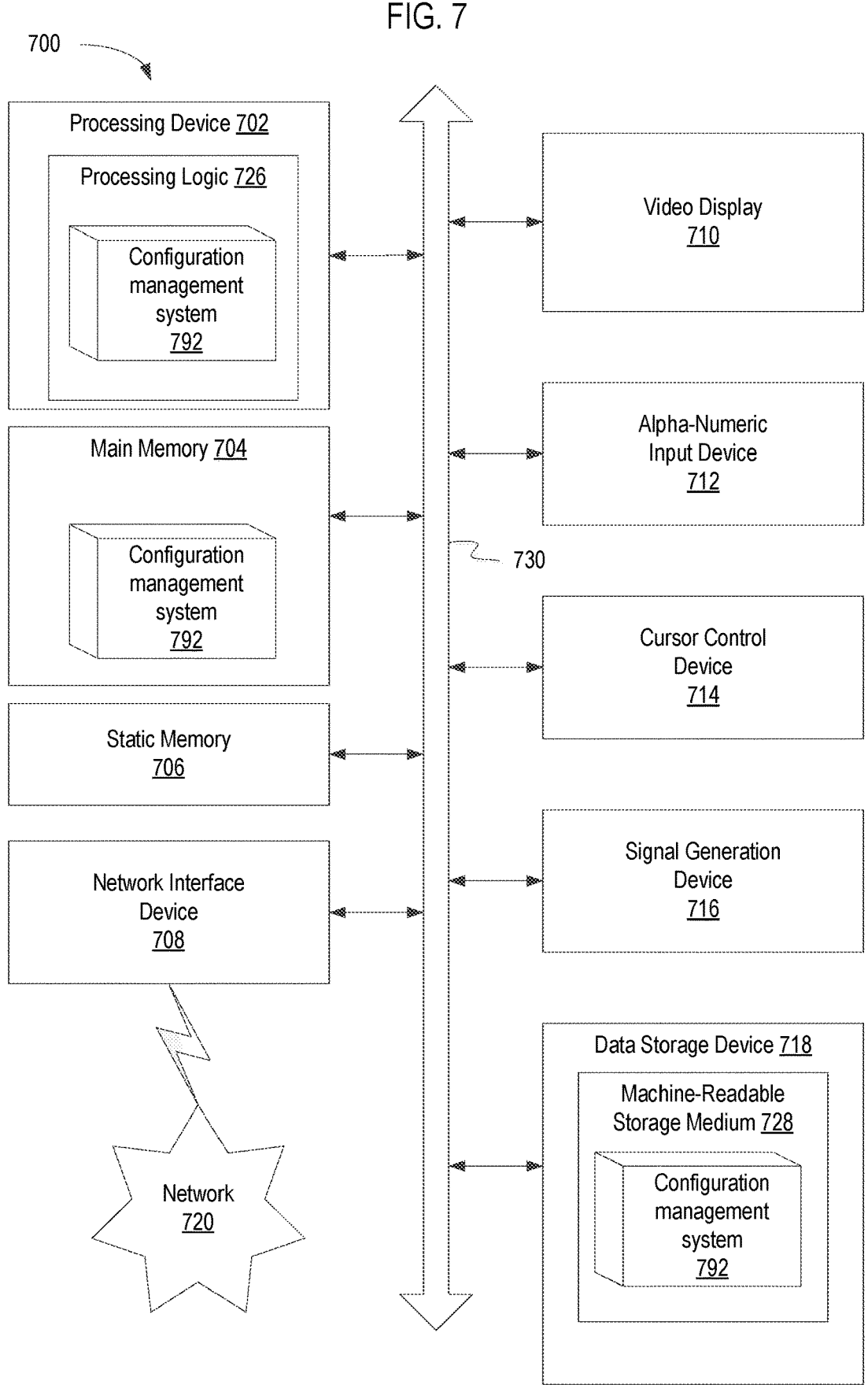
FIG. 7 is a schematic block diagram that provides an example illustration of a computing environment executing instructions relating to deploying an application, according to one embodiment.

FIG. 7 illustrates a diagrammatic representation of a machine in the example form of a computer system 700 including a set of instructions executable by a configuration management system 110 to cause the system to perform any one or more of the methodologies discussed herein. In one embodiment, the configuration management system may include instructions to enable execution of the processes and corresponding components shown and described in connection with FIGS. 1-6.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. In various implementations of the present disclosure, the processing device 702 is configured to execute instructions for a configuration management system 792 for performing the operations and processes described herein. The configuration management system 792 may correspond to configuration management system 110 of FIG. 1 or configuration management system 510 of FIG. 5 in embodiments.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions of the configuration management system 792 embodying any one or more of the methodologies or functions described herein. The instructions may also reside, completely or at least partially, within the main memory 704 and/or within processing logic 726 of the processing device 702 during execution thereof by the computer system 700, the main memory 704 and the processing device 702 also constituting computer-readable media.

The instructions may further be transmitted or received over a network 720 via the network interface device 708. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely presented as examples. Particular implementations may vary from these example details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "configuring", "detecting", "determining", "invoking", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, from a customer system, a rate parameter identifying a rate in which a configuration command is to be invoked on a plurality of virtual computing instances associated with the customer system;
   configuring a first number of virtual computing instances of the plurality of virtual computing instances, the configuring based, at least in part, on a first invocation decision generated by a service executing code provided by the customer system, wherein the first invocation decision is based at least in part on the rate parameter;
   detecting, by a processing device, a first set of configuration results comprising an error rate corresponding to a quantity of errors identified in connection with invocation of the configuration command on the first number of virtual computing instances;
   providing the first set of configuration results to the service;
   receiving a second invocation decision generated by the service based at least in part on the first set of configuration results, wherein the second invocation decision indicates a second number of virtual computing instances of the plurality of virtual computing instances to be configured; and
   configuring the second number of virtual computing instances based, at least in part, on the second invocation decision generated by the service.

2. The method of claim 1, wherein the service receives the rate parameter from the customer system.

3. The method of claim 1, wherein the rate parameter is used by the service to generate the first invocation decision.

4. The method of claim 1, wherein the rate parameter indicates a first time period within which the first number of virtual computing instances is to be configured.

5. The method of claim 1, wherein the rate parameter indicates a requirement for approval from the customer system corresponding to configuring of one or more of the first number of virtual computing instances.

6. The method of claim 1, further comprising receiving configuration information from the customer system, wherein the configuration information identifies a configuration command and a total number of virtual computing instances to be configured.

7. A system comprising:
   a processing device; and
   memory to store computer-executable instructions that, if executed, cause the processing device to:
      configure a first portion of a plurality of computing devices based on a rate parameter received from a customer system, wherein the rate parameter identifies a rate in which a configuration command is invoked on the plurality of computing devices;
      determine an error rate corresponding to a quantity of errors identified in connection with invocation of the configuration command on the first portion of the plurality of computing devices; and
      configure a second portion of the plurality of computing devices based on the rate parameter and the error rate.

8. The system of claim 7, the processing device to identify the one or more errors associated with configuring the first portion of the plurality of computing devices, wherein the error rate is determined based on the one or more errors.

9. The system of claim 7, the processing device to configure the first portion of the plurality of computing devices by invoking the configuration command on the first portion of the plurality of computing devices during a first stage.

10. The system of claim 9, the processing device to configure the second portion of the plurality of computing devices by invoking the configuration command on the second portion of the plurality of computing devices during a second stage.

11. The system of claim 10, the processing device to initiate the second stage in response to a determination that the error rate corresponding to the first stage does not exceed an error rate threshold value.

12. The system of claim 7, wherein the rate parameter comprises a function to be used to calculate a quantity of computing instances in the first portion of the plurality of computing devices.

13. The system of claim 7, in response to a determination that the error rate is less than an error rate threshold, the processing device to calculate a quantity of the second portion of the plurality of computing devices by applying the rate parameter to a remaining portion of the plurality of computing devices.

14. The system of claim 7, the processing device to:
determine an additional error rate corresponding to configuring the second portion of the plurality of computing devices exceeds an error rate threshold value; and
terminate further configuring of a remaining portion of the plurality of computing devices.

15. A non-transitory computer-readable storage device storing computer-executable instructions that, if executed by a processing device, cause the processing device to:
configure a first portion of a plurality of computing devices based on a rate parameter received from a customer system, wherein the rate parameter identifies a rate in which a configuration command is invoked on the plurality of computing devices;
determine an error rate corresponding to a quantity of errors identified in connection with invocation of the configuration command on the first portion of the plurality of computing devices; and
configure a second portion of the plurality of computing devices based on the rate parameter and the error rate.

16. The non-transitory computer-readable storage device of claim 15, the processing device to identify the one or more errors associated with configuring the first portion of the plurality of computing devices, wherein the error rate is determined based on the one or more errors.

17. The non-transitory computer-readable storage device of claim 15, the processing device to configure the first portion of the plurality of computing devices by invoking the configuration command on the first portion of the plurality of computing devices during a first stage.

18. The non-transitory computer-readable storage device of claim 17, the processing device to configure the second portion of the plurality of computing devices by invoking the configuration command on the second portion of the plurality of computing devices during a second stage.

19. The non-transitory computer-readable storage device of claim 18, the processing device to initiate the second stage in response to a determination that the error rate corresponding to the first stage does not exceed an error rate threshold value.

20. The non-transitory computer-readable storage device of claim 15, wherein the rate parameter comprises a function to be used to calculate a quantity of computing instances in the first portion of the plurality of computing devices.

\* \* \* \* \*